J. A. WARD.
MEANS FOR DEVELOPING POWER FROM A RUNNING STREAM.
APPLICATION FILED OCT. 14, 1914.

1,201,658.

Patented Oct. 17, 1916.
3 SHEETS—SHEET 1.

WITNESSES:

INVENTOR.
John A. Ward
BY
L. L. Westfall  ATTORNEY.

J. A. WARD.
MEANS FOR DEVELOPING POWER FROM A RUNNING STREAM.
APPLICATION FILED OCT. 14, 1914.

1,201,658.

Patented Oct. 17, 1916.
3 SHEETS—SHEET 2.

WITNESSES:

INVENTOR
John A. Ward
BY
L. L. Westfall
ATTORNEY

J. A. WARD.
MEANS FOR DEVELOPING POWER FROM A RUNNING STREAM.
APPLICATION FILED OCT. 14, 1914.
1,201,658.
Patented Oct. 17, 1916.
3 SHEETS—SHEET 3.
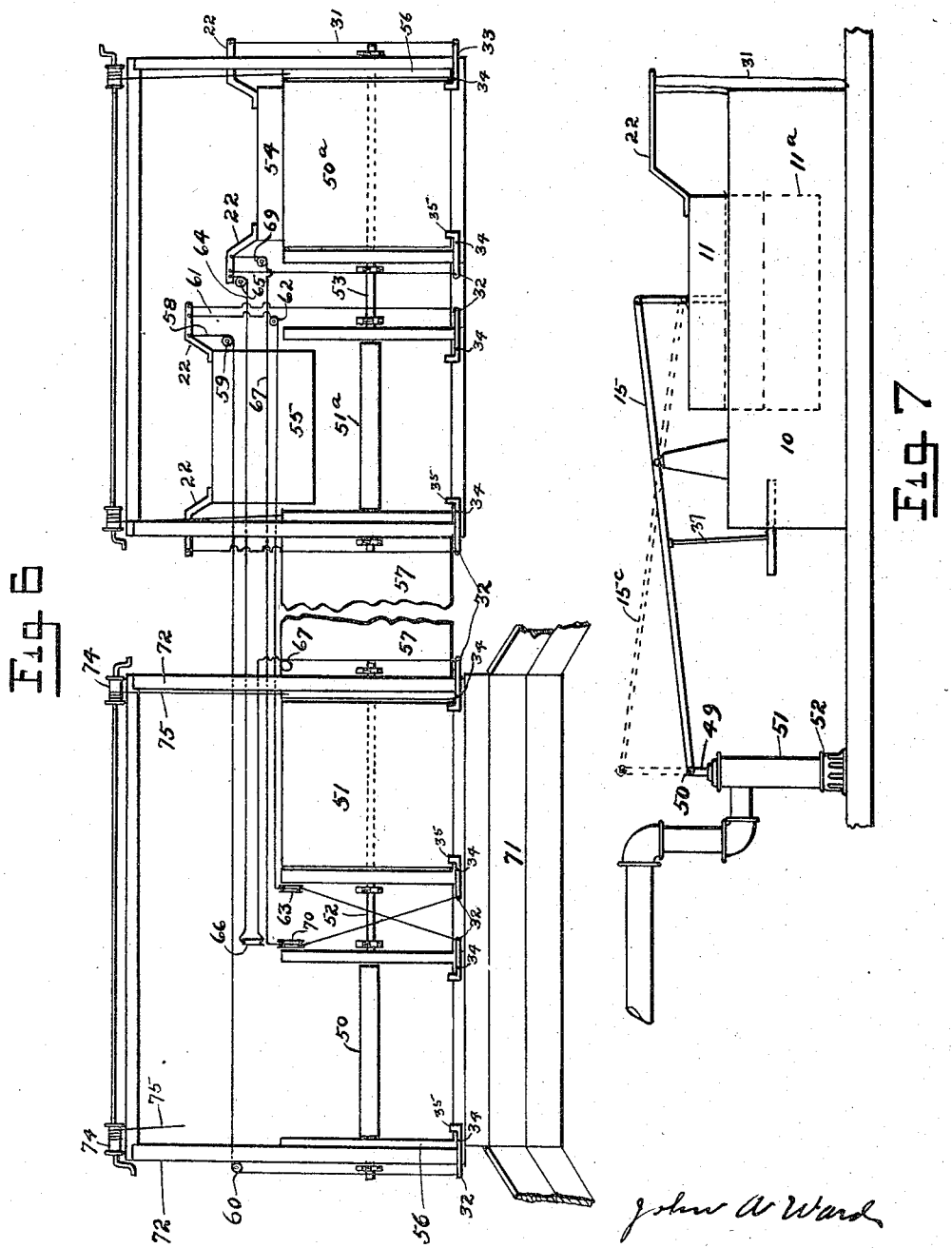

UNITED STATES PATENT OFFICE.

JOHN A. WARD, OF SPOKANE, WASHINGTON.

MEANS FOR DEVELOPING POWER FROM A RUNNING STREAM.

1,201,658.       Specification of Letters Patent.       Patented Oct. 17, 1916.

Application filed October 14, 1914. Serial No. 866,613.

*To all whom it may concern:*

Be it known that I, JOHN A. WARD, a citizen of the United States of America, residing at Spokane, in the county of Spokane and State of Washington, have invented certain new and useful Improvements in Means for Developing Power from a Running Stream, of which the following is a specification.

This invention pertains to means for developing power from a flowing stream by means of a float mounted in a casing and adapted for resting on the surface of the water and to rise and fall with the rising and falling of the water and to be so connected up with operative machinery that the rising and falling of the float will operate the machinery.

The object of the invention is to so construct the float and coöperative parts as to get the maximum amount of power with the least possible mechanism and most efficient operation.

The construction and operation of the device will be hereinafter particularly described and illustrated in the accompanying drawings, in which—

Figure 1:
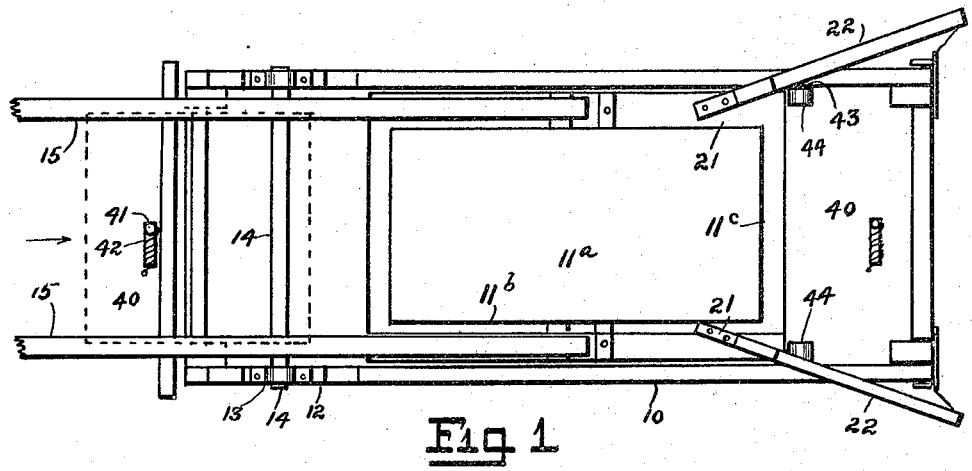
Figure 2:
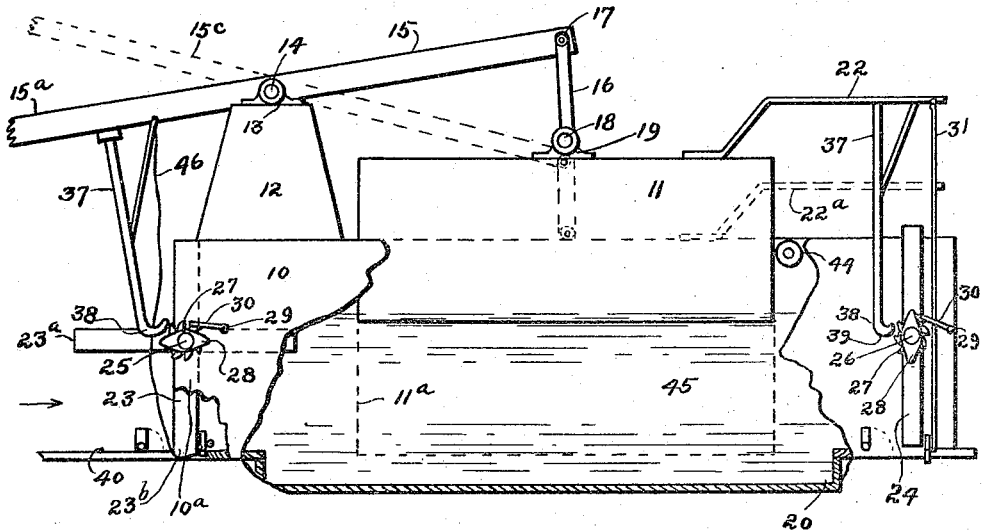
Figure 3:
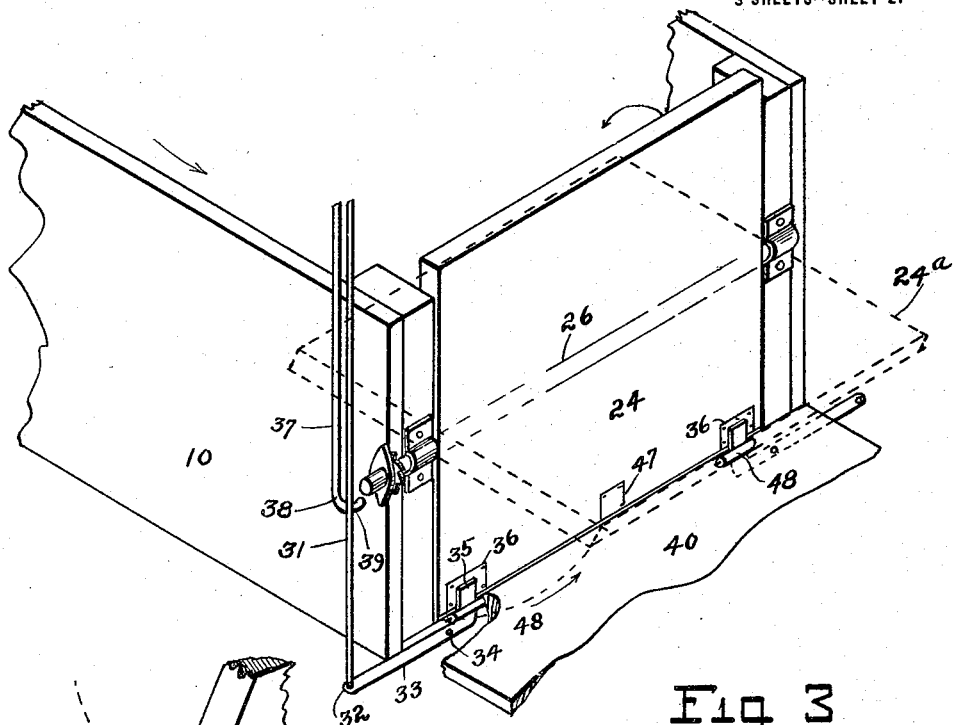
Figure 4:
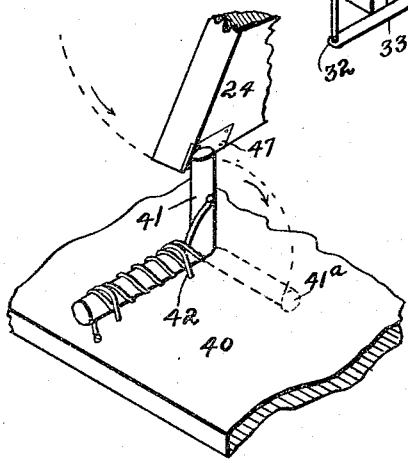
Figure 5:
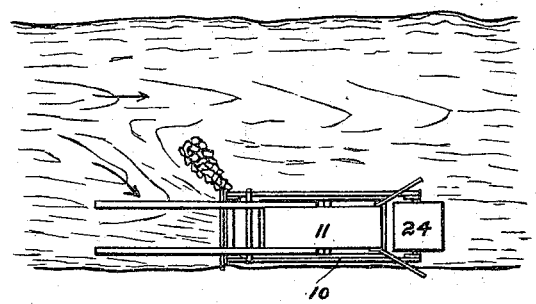

Figure 1, is a top plan view of the device with the arms broken-away, Fig. 2, is a side elevation with portions broken-away illustrating the operation of the float which is shown floating on the surface of water, Fig. 3, is an enlarged elevation of the front end of the device, showing the side walls broken-away, Fig. 4, is an enlarged broken-away view showing the construction whereby the closing of the gates is cushioned, Fig. 5, is a top plan view of the device, shown in position in a stream, Fig. 6, is a diagrammatic view showing two sets of gates and two floats so connected that the floats operate in alternate movement, the diagram showing the two ends of the construction, the connecting mechanism being broken-away in order that the ends may be shown, and Fig. 7, is a side elevation of the construction shown in Fig. 1.

A casing 10 is provided in which is mounted a float. Mounted on brackets 12 are bearings 13 in which is rotatably mounted a horizontally arranged shaft 14 to which are secured beams 15 having links 16 rotatably attached to one end thereof, as by pins 17, the links 16 being rotatably attached to the float, as by studs 18, mounted in bearings 19 attached to the walls of the float. In the bottom of the casing 10 is provided a basin 20 of sufficient size to easily receive the float 11. Attached to the walls of the float 11, as at 21, are arms 22, extending outwardly over the end of the casing 10. The ends of the casing 10 are provided with gates 23 and 24, rigidly mounted on shafts 25 and 26 respectively and adapted to be rotatably operated. To the ends of the shafts 25 and 26 are rigidly secured ratchets 27 and cams 28. Secured to the walls of the casing 10, as at 29, are pawls 30 adapted to engage the ratchets 27. Secured to the ends of the arms 22 are cables 31 (Fig. 3) having their lower ends pivotally connected, as at 32, to a lever 33 fulcrumed at 34. The levers 34 have upwardly extending lugs 35 normally in the positions shown in Fig. 3, and serving to hold the bottom of the gates 23 and 24 against rotation. Metal plates 36 are secured to the gates 23 and 24 at the places where the lugs 35 engage the same to prevent the lugs 35 from wearing into the gates 23 and 24 which are likely to be made of wood.

Extending downwardly from the arms 22 and from the beams 15 are rods 37 having curved ends 38 forming a substantially crescent shaped under surface 39. The rods 37 extending from the beams 15 are on the opposite side of the shaft 14 from the links 16 supporting the float 11. Secured to the floor 40 of the casing 10 in the path of the gates 23 and 24 are pins 41 normally held in the position shown in Fig. 4 by the coil springs 42. Attached to the inner walls of the casing 10, as at 43, adjacent to the float 11 are rollers 44 (Fig. 1).

The apparatus is adapted for and intended to be stationed in a running stream of water as indicated in Fig. 5. The apparatus will be so adjusted that the gate 23 will be open and the gate 24 closed, the gate 23 facing the upstream and the gate 24 facing the downstream. The float 11 is preferably made with closed bottom 11ª, sides 11ᵇ and ends 11ᶜ and open top, and adapted to float. Water enters the casing 10 at the end 10ª while the gate 23 is open, filling the casing 10 and elevating the float 11 to the position shown in Fig. 2. The raising of the float 11 as shown lowers the end 15ª of the beam 15 forcing the crescent shaped surface 25 of the end 38 of the rod 37 against the cam 28 with sufficient power to rotate the shaft 25, thereby changing the position of the gate 23 from the open position of 23ª to the closed position of 23ᵇ, thereby shutting off the inflow of water into the casing 10.

The elevating of the float 11 as described carries upwardly with it the arms 22 attached thereto, drawing upwardly on the cables 31 (Fig. 3) which rocks the levers 33 on the fulcrum 34, forcing downwardly the lug 35 thereby releasing the gate 24 which is opened outwardly by the force of the water in the casing to the position 24ª, allowing the water to escape from the casing 10. With the escaping of the water 45 from the casing 10, the float 11 is lowered to the position shown by the dotted lines 11ª, carrying the beam 15 to the position of the dotted lines 15ᶜ and the arms 22 to the position of the dotted lines 22ª (Fig. 2). With this change of position of the float 11 and of the beam 15 and arms 22 the cables 46 rack the levers 33 releasing the gate 23 by the withdrawal of the support of the lugs 35 so that the gate 23 opens to the position 23 by the force of the water against it from the upriver side, and the gate 24 is closed by the action of the ends 38 of the rods 37 extending downwardly from the arms 22 striking against the cams 28 on the shaft 26. The pawls 30 engaging the ratchets 27 serve to steady the shafts 25 and 26 so as to prevent a rearward movement of the doors 23 and 24. In closing, the doors 23 and 24 strike the pins 41 in their path forcing the pins 41 against the action of the springs 42 to the position 41ª out of their path, thereby cushioning the final closing movement of the doors. The springs 42 return the pins 41 to the position shown in Fig. 4 after the doors have passed over them. Metal plates 47 attached to the doors 23 and 24 prevent the pins 41 from cutting into the door material. Rollers 48 mounted adjacent to the lugs 35 (Fig. 3) aid the movements of the lugs in their change of position. The power may be taken from the beam 15 as shown in Fig. 7 wherein a piston rod 49 is pivoted, as at 50, to the beam 15 and operated to work a pump 51 having its base 52 submerged.

In Fig. 7 I have illustrated a mechanism whereby a pair of floats my be operated alternately. In this illustration gates 50 and 51 are mounted at the front end of the apparatus, both being made rigid to one and the same shaft 52 and corresponding gates 50ª and 51ª are rigidly mounted to one and the same shaft 53 at the rear end of the apparatus. The position of the gates on the shafts are such that when one front gate 50 is open, the other gate 51 is closed. While the rear gate 50ª is closed and the rear gate 51ª open, placing the float 54 in a down position and the float 55 in an elevated position, or more accurately speaking, the float 54 is falling while the float 55 is rising, and vice versa. The alternating movement is accomplished by the manner in which the cables are arranged that open and close the gates. For instance, when the gate 50 at the front end of the casing 56 is open and the gate 50ª at the rear end of the same casing is closed, the float 54 is falling by reason of the water receding from the casing 56, and while the gate 51 in the front end of the casing 57 is closed and the gate 51ª at the rear end of the casing 57 is open, the float 55 is rising. Cables 31 reaching from the arms 22 are utilized to operate the levers 33 to release the gates to the same effect as previously described. The cable 58 is attached at one end to one of the arms 22 on the float 55, passes over pulleys 59 and 60 and connects with one of the levers 33 of the casing 56 at the front end where the gate 50 is swung and cable 61 is attached to one of the arms 22 of the float 55 passes over the pulleys 62 and connects with the other of the levers 33 of the casing 56 at the front end where the gate 50 is swung. Cable 64 attached to one of the arms 22 of the float 54 passes over the pulleys 65 and 66 and is connected with one of the levers 33 of the casing 57 at the front end where the gate 51 is swung and cable 68 attached to one of the arms 22 of the float 54 passes over pulleys 69 and 70 and connects with the other of the levers 33 of the casing 57 at the front end where the gate 51 is swung. The rising and falling of the floats 54 and 55 will thus draw the respective cables and operate the levers 33 to release the gates and as the floats are timed as aforesaid the gates will be alternated in their movements so that the casings 56 and 57 will alternately fill with water and empty thereby perpetuating the alternate movements of the floats. The casings 56 and 57 are mounted on a frame 71 having uprights 72 extending along the sides of the casings 56 and 57. A crank shaft 73 extends horizontally from one upright 72 to the other at the tops thereof and is provided with spools 74 to which are attached one end of cables 75, the other end of the cables being attached to the casings 56 and 57 by means of which mechanism the casings 56 and 57 may be adjusted upwardly and downwardly to meet the rising and falling of the stream.

I reserve the right to modify my construction in minor details within the scope of my disclosure and claims.

What is claimed is,

1. Means for developing power from a running stream comprising a casing adapted for being submerged in a running stream and having closed sides and bottom and a gate at each end adapted to be rotatably operated, a float mounted within the case, a beam fulcrumed to the casing and pivotally connected with the float and connections between the float and the gates whereby the gates with the aid of the water are alternately opened and closed with the rising and falling of the float.

2. Means for developing power from a running stream comprising a casing adapted for being submerged in a running stream and having closed sides and bottom and a gate at each end adapted to be rotatably operated, a float mounted within the casing, a beam fulcrumed to the casing and pivotally connected with the float and connections between the float and the gates whereby the gates with the aid of the water are alternately opened and closed with the rising and falling of the float, together with a basin in bottom of the casing of sufficient size to receive the float and adapted for holding water to cushion the float in its descent.

3. Means for developing power from a running stream comprising a casing adapted for being submerged in a running stream and having closed sides and bottom and a gate at each end adapted to be rotatably operated, a float mounted within the casing, a beam fulcrumed to the casing and pivotally connected with the float and connections between the float and the gates whereby the gates with the aid of the water are alternately opened and closed with the rising and falling of the float, the connections between the float and gates comprising levers fulcrumed to the casing and having lugs normally adapted to retain the gates in a closed position, rods extending from the levers, arms extending from the float and connections between the rods and arms whereby by the rising and falling of the float the levers are operated to release the lugs to free the gates from a closed position.

4. Means for developing power from a running stream comprising a casing adapted for being submerged in a running stream and having closed sides and bottom and a gate at each end adapted to be rotatably operated, a float mounted within the casing, a beam fulcrumed to the casing and pivotally connected with the float and connections between the float and the gates whereby the gates with the aid of the water are alternately opened and closed with the rising and falling of the float, together with means for cushioning the closing movement of the gates.

5. Means for developing power from a running stream comprising casings adapted for being submerged in a running stream and having closed sides and bottom, partitions between each casing, a gate at each end of the casing adapted to be rotatably operated, a float mounted within each casing, a beam fulcrumed to each casing and pivotally connected to the float within the casing and connections between the casings, floats and gates whereby the front and rear gates with the aid of the water are alternately opened and closed.

6. Means for developing power from a running stream comprising casings adapted for being submerged in a running stream and having closed sides and bottom, partitions between each casing, a gate at each end of each casing adapted to be rotatably operated, a float mounted within each casing, a beam fulcrumed to each casing and pivotally connected to the float within the casing and connections between the casings, floats and gates whereby the front and rear gates with the aid of the water are alternately opened and closed, such connections comprising levers fulcrumed to the casings, lugs on the ends of the levers normally adapted to hold the gates in a closed position, arms attached to the floats and cables attached to the levers and to the arms on the floats whereby the levers are rocked to release the lugs from their normal positions to permit the opening of the gates, the floats being timed so that they will alternately rise and fall with the rising and falling of the water in the casings as the gates are closed and opened.

In testimony whereof I affix my signature in presence of two witnesses.

JOHN A. WARD.

Witnesses:
 STANLEY MACDONALD,
 L. L. WESTFALL.